(12) United States Patent
Bunkenburg et al.

(10) Patent No.: US 6,597,510 B2
(45) Date of Patent: Jul. 22, 2003

(54) METHODS AND APPARATUS FOR MAKING OPTICAL DEVICES INCLUDING MICROLENS ARRAYS

(75) Inventors: Joachim Bunkenburg, Victor, NY (US); Lovell E. Comstock, II, Charlestown, NH (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/002,535

(22) Filed: Nov. 2, 2001

(65) Prior Publication Data

US 2003/0086178 A1 May 8, 2003

(51) Int. Cl.⁷ .......................... G02B 27/10; B29D 11/00
(52) U.S. Cl. ........................................ 359/620; 264/2.5
(58) Field of Search ................ 359/620, 619, 359/637, 625, 642; 264/2.5, 219, 1.1, 1.7

(56) References Cited

U.S. PATENT DOCUMENTS 4,198,182 A * 4/1980 Green .......................... 409/132
4,861,140 A   8/1989 Lucitte et al. ............... 359/642

(List continued on next page.)

FOREIGN PATENT DOCUMENTS

| EP | 0 450 780 A2 | 10/1991 |
| EP | 1 069 082 A2 | 1/2001 |
| WO | WO 00/20899 | 4/2000 |

OTHER PUBLICATIONS

Cox, W.R. et al., MicroJet Printing for Low Cost Optical Interconnects, Printout of Web Site Pages at http://www.microfab.com/mfabweb/ishm/ishm.html, pp. 1–5, Mar. 31, 1999.

Gale, M.T., Replication Technology for Diffractive Optical Elements, SPIE vol. 3010, pp. 111–123, 1997.

Jay, T.R. et al., Effect of Refractive Microlens Array Fabrication Parameters on Optical Quality, SPIE vol. 1751, Miniature and Micro–Optics, pp. 236–245, 1992.

Suleski, T. et al., Gray–scale Masks for Diffractive–Optics Fabrication: I. Commercial Slide Imagers, Applied Optics, vol. 34, No. 32, pp. 7507–7517, 1995.

*Primary Examiner*—Georgia Epps
*Assistant Examiner*—Omar Hindi
(74) *Attorney, Agent, or Firm*—Gregory V. Bean

(57) ABSTRACT

Microlens arrays, especially useful for optical coupling in optical switches of fiber optic telecommunications systems are produced with optical quality requisite for such applications with a replicating tool. This tool is made using a form tool set up in a rotating spindle of a precision air bearing milling machine at an angle of inclination such that the point of zero surface velocity is maintained outside of the surface of substrate machined to make the tool for replicating the arrays. The tip of the form tool has a profile corresponding to the profile of the lenses of the array, such as a generally circular profile having a radius centered at the axis of rotation of the form tool. The form tool is reciprocated with respect to the surface so as to form cavities of the desired profile, radius and depth which corresponds each identical lens of the array. To provide arrays the form tool is raised and the substrate is translated to preprogrammed positions. When these positions are reached the reciprocation and cutting action of the tool is repeated. The replicating tool containing cavities defining the lenses of the array which provides a master. The master may be used to replicate identical arrays. Lenses so formed may be positive with convex surfaces. Arrays of lenses, which are negative and have concave surfaces, may be made using an intermediate master replicated from first master. The profile of the lenses may be altered by changing the shape of the form tool cutting surface or by translating the substrate during reciprocation of the formed tool as the profile of each cavity is being machined. In addition to lenses having optical power, reflectors with desired power may also be made with the machined master or intermediate master.

27 Claims, 5 Drawing Sheets

U.S. PATENT DOCUMENTS

| | | | |
|---|---|---|---|
| 5,148,322 A | 9/1992 | Aoyama et al. | 359/708 |
| 5,298,366 A | 3/1994 | Iwasaki et al. | 43/321 |
| 5,300,263 A | 4/1994 | Hoopman et al. | 264/2.5 |
| 5,439,621 A | 8/1995 | Hoopman | 264/2.5 |
| 5,446,815 A | 8/1995 | Ota et al. | 385/33 |
| 5,453,876 A | 9/1995 | Hamada | 359/625 |
| 5,519,539 A * | 5/1996 | Hoopman et al. | 359/619 |
| 5,555,476 A | 9/1996 | Suzuki et al. | 349/95 |
| 5,581,379 A | 12/1996 | Aoyama et al. | 349/5 |
| 5,629,765 A * | 5/1997 | Schmutz | 250/201.9 |
| 5,801,884 A | 9/1998 | Sato et al. | 359/620 |
| 5,861,114 A | 1/1999 | Roffman et al. | 264/7.5 |
| 5,867,321 A | 2/1999 | Nakama et al. | 359/619 |
| 5,876,642 A | 3/1999 | Calderini et al. | 264/2.5 |
| 5,886,760 A | 3/1999 | Ueda et al. | 349/95 |
| 5,948,281 A | 9/1999 | Okazaki et al. | 216/26 |
| 5,982,552 A | 11/1999 | Nakama et al. | 359/620 |
| 5,997,756 A | 12/1999 | Okazaki et al. | 716/26 |
| 6,015,512 A * | 1/2000 | Yang et al. | 264/2.2 |
| 6,069,740 A | 5/2000 | Hamanaka | 359/620 |
| 6,072,634 A | 6/2000 | Broome et al. | 359/637 |
| 6,129,866 A | 10/2000 | Hamanaka et al. | 264/1.7 |
| 6,163,407 A | 12/2000 | Okazaki et al. | 359/619 |
| 6,305,194 B1 * | 10/2001 | Budinski et al. | 264/1.1 |
| 6,402,996 B1 * | 6/2002 | Border et al. | 264/2.5 |

* cited by examiner

METHODS AND APPARATUS FOR MAKING OPTICAL DEVICES INCLUDING MICROLENS ARRAYS

The present invention relates to methods and apparatus for making optical devices including microlens arrays. A microlens has an aperture or radius of less than a few millimeters. The invention is especially suitable for making microlens arrays for optical switches. Generally, the invention may be used to make optical devices for various optical coupling applications, including light conditioning and focusing to enhance optical displays, such as liquid crystal displays.

A principal application for the invention is to provide lenses for optical coupling devices. Such a device is shown in FIG. 1 for conditioning and especially collimating optical pulses traveling along an optical fiber. The end of the fiber provides a diverging beam and may be secured to a substrate on which of the lens, which collimates the beam, is disposed. The diverging beam when outputted as a collimated beam enhances the efficient propagation of the optical pulses in air, minimizing insertion loss. A prior art optical switch is shown in FIG. 2. Small lenses are needed in order to handle hundreds or thousands of input and output fibers in an optical switch arrays. These lenses allow the optical switch to be packages in a manner compatible with tiltable mirrors which route the optical pulses between selected input and output fibers of the switch. Each input fiber requires a small lens to collimate the beam, such that it may be directed and switched by the mirrors. The output lenses are in another microlens array which focuses the switched pulses to a designated output fiber. It is necessary that these microlens arrays be made to high precision, even though very small in size. Further information respecting optical switches, the routing mirrors and packaging is available in the published patents and publications for example, International Application No. WO 00/20899 published under the Patent Cooperation Treaty on Apr. 13, 2000.

Small or micro-miniature optical devices (lenses and even reflectors which are suitable for use in optical switches) are difficult to make with requisite geometrical and optical precision. Such devices and the various methods which have heretofore been proposed for their manufacture are summarized in the text entitled "Micro-optics: Elements, Systems and Applications", published by Taylor and Francis in 1997. It has been proposed to micro-machine or electroform molds by means of which the microlens arrays may be cast, embossed or stamped. The term mold is used generically herein to indicate any tool for replication of an optical device such as a microlens array.

Further information as to such molds and their manufacture are contained in the technical literature, including by way of example the following: Hoopman et al., U.S. Pat. No. 5,300,263, issued Apr. 5, 1994; Hoopman et al., U.S. Pat. No. 5,519,539, issued May 21, 1996; Aoyama et al., U.S. Pat. No. 5,581,379, issued Dec. 3, 1996; Roffman et al., U.S. Pat. No. 5,861,114, issued Jan. 19, 1999; Schmutz, U.S. Pat. No. 5,629,765, issued May 13, 1997; Hamanaka, U.S. Pat. No. 6,069,740, issued May 30, 2000; Hamanaka et al., U.S. Pat. No. 6,129,866, issued Oct. 10, 2000; and European Published Patent Application EP 1069082 A2, published Jan. 17, 2001.

Microlens arrays have been proposed to be made directly by photolithography. Examples of this technique are in Lucitte et al., U.S. Pat. No. 4,861,140, issued Aug. 29, 1989; Iwasaki et al., U.S. Pat. No. 5,298,366, issued Mar. 29, 1994; Hoopman, U.S. Pat. No. 5,439,621, issued Aug. 8, 1995; Hamada, U.S. Pat. No. 5,453,876, issued Sep. 26, 1995; Sato et al., U.S. Pat. No. 5,801,884, issued Sep. 1, 1998; Ueda et al., U.S. Pat. No. 5,886,760, issued Mar. 23, 1999; Okazaki et al., U.S. Pat. No. 5,948,281, issued Sep. 7, 1999. Ion diffusion has also been proposed to make lenses in microlens arrays. For example, see Nakama et al., U.S. Pat. No. 5,867,321, issued Feb. 2, 1999 and U.S. Pat. No. 5,982,552, issued Nov. 9, 1999.

Photolithography, with optical and electron beams, has also been proposed to make molds by means of which microlens arrays can be produced. See Aoyama et al., U.S. Pat. No. 5,148,322, issued Sep. 15, 1992; Suzuki et al., U.S. Pat. No. 5,555,476, issued Sep. 10, 1996; and Calderini et al., U.S. Pat. No. 5,876,642, issued Mar. 2, 1999.

It is a feature of the present invention to both simplify and improve upon such heretofore proposed methods and apparatus for making optical devices and particularly microlens arrays. The optical quality in terms of selectable and precise focal lengths, focal length uniformity from lens to lens in the array, absence of aberration and surface irregularity, smooth surface finish, positional accuracy in the array of each lens, and consistency of optical centration, are obtainable with the method and apparatus of the present invention. The lenses which may be made in accordance with the invention are of such quality as to be diffraction limited, that is to have wavefront aberrations of less than a quarter wavelength of the radiation at the center of the wavelength band which is focused by the lens. The optical devices (microlens arrays) when used in pairs as in FIG. 2, because of their uniformity, positional accuracy in the array and ease of alignment introduce acceptable insertion loss in the optical switching system, which loss may be less than in the case of arrays made with heretofore proposed methods.

Another feature of the invention is that the optical devices and components which may be fabricated in accordance with the invention may be so called anamorphic optical components, for example cylindrical and toric lens.

It is a feature of the invention to be able to control the focal length of the lenses and to provide focal length uniformity from lens to lens in the microlens array. Another feature is that the surface irregularity or aberrations of the lens, as may be shown by interferometry, is minimized. Optical quality surfaces are obtainable with the invention, for example roughness of less than 50 Angstroms. The tooling used in the invention affords positional accuracy in addition to the foregoing features and enhances optical centration; that is the optical and physical axes are essentially coaxial.

It is a further feature of the invention to machine using very hard, preferably diamond, cutting tools which define lens surfaces and can be precisely rotated and/or moved with respect to a master or mold which is being machined. Chemical edging and polishing used to make the tool provides smoothness which carries over into the smoothness and regularity of the mold and the optical devices, particularly microlens arrays, replicated with the mold.

Briefly described, the invention is used in a method for making molds from which optical devices, such as microlens arrays, may be replicated. A cutting or form tool, preferably having a diamond tip, the surface of which corresponds in shape to the shape of the surface of the optical devices, is inclined, with respect to a substrate from which the mold is machined by the tool, at a precise angle dictated by the height of the optical device (the sag or radius of the each lens) replicated using the mold. The tool is rotated on the inclined axis and the cutting surface is brought into engagement with the mold surface. The shape of the tool forms a cavity or cavities in the surface of shape corresponding to the shape of the cutting surface of the tool. The point of zero velocity (where the axis of rotation crosses the cutting surface) is maintained away from the mold surface thereby ensuring that only swarf is removed or scooped out of the mold surface, preferably continuously, as each cavity is formed, avoiding chips which may adversely effect the smoothness and regularity of each cavity. The substrate, from which the molding tool is made, is preferably disposed on an X/Y table and moved to selected, different positions where other cavities are cut to provide the mold or master from which devices may be replicated. If the devices are positive lenses they may be directly cast with the mold. The mold may also be used for stamping or embossing in plastic or glass which may be in softened state during embossing. If negative or concave lenses corresponding to the cavity profiles is desired, an intermediate master may be made by casting. This master may be coated with hard or chemically (corrosive) resistant material, for example nickel, and used to mold, emboss or stamp one or more convex lenses. It will be appreciated that a complete microlens array is formed simultaneously in each replication, and each array so replicated will be consistent and identical in shape and optical properties. This makes such arrays especially suitable for use in optical switches such as shown in FIG. 2.

If optical devices with anamorphic surfaces are required, the mold (the table on which the mold is disposed) may be moved during cutting. The cutting surface may be essentially cylindrical (tooth with a cylindrical or spherical cutting tip). Cavities with toric or ellipsoidal surfaces may be cut by programming the relative velocity of displacement of the substrate and form tool during machining.

The foregoing and other objects, features and advantages of the invention have been made, or will be made more, apparent from the foregoing as well as the following description, when taken in connection with the accompanying drawings in which.

Figure 3A:
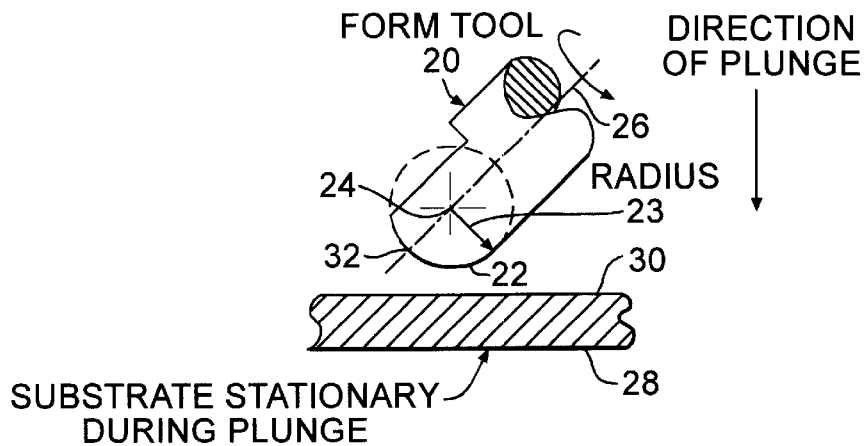
Figure 4:
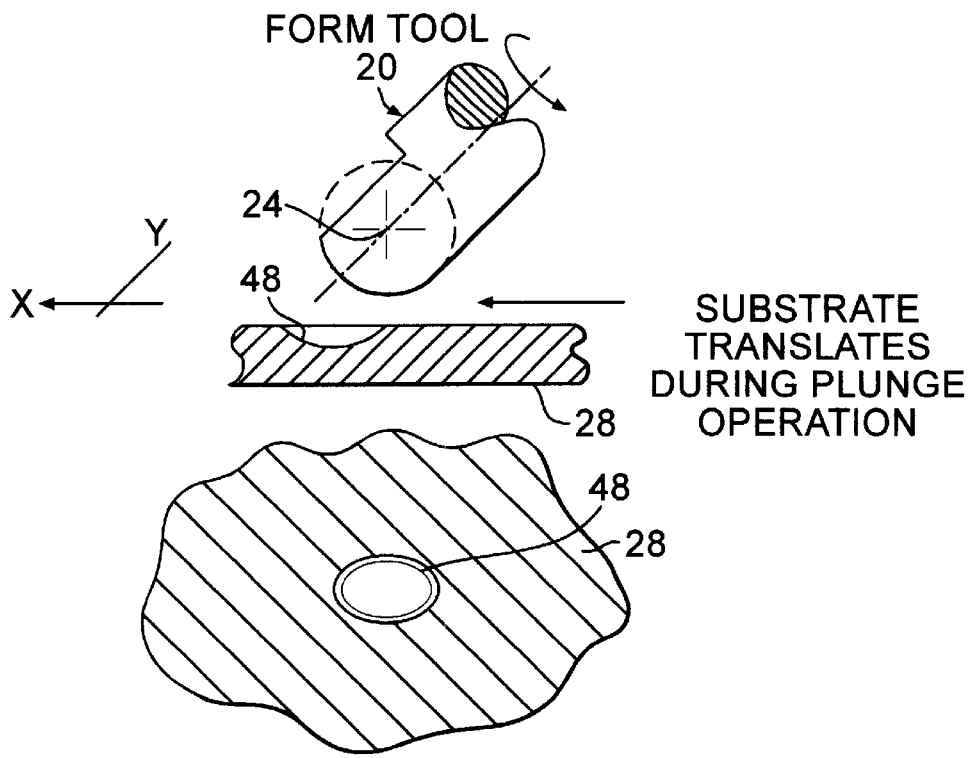
Figure 5:
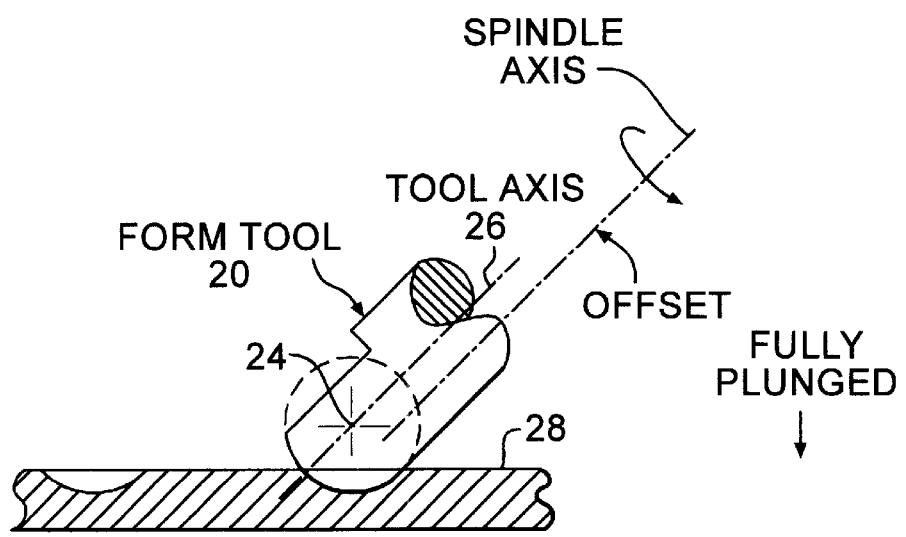
Figure 6:
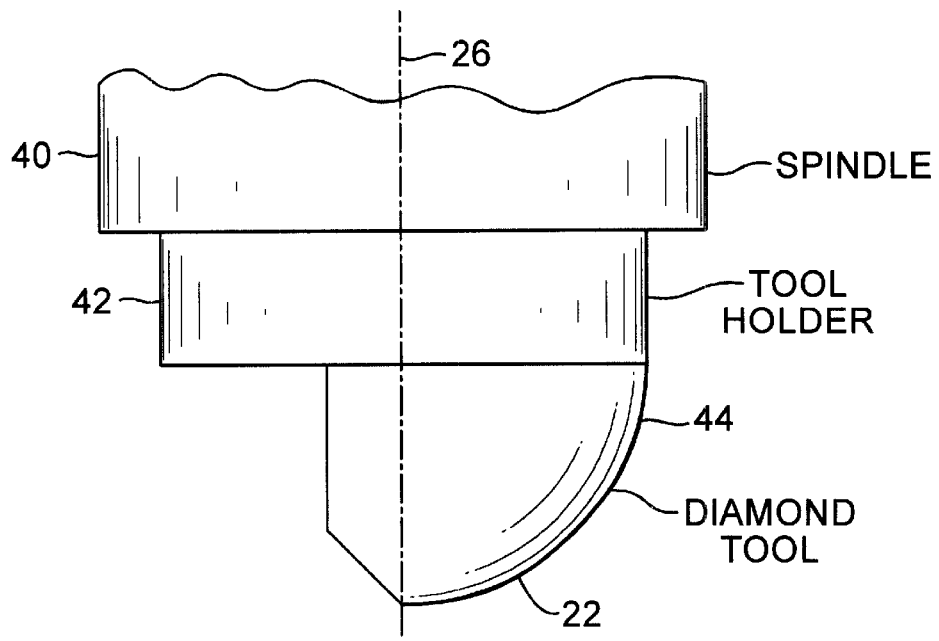
Figure 7:
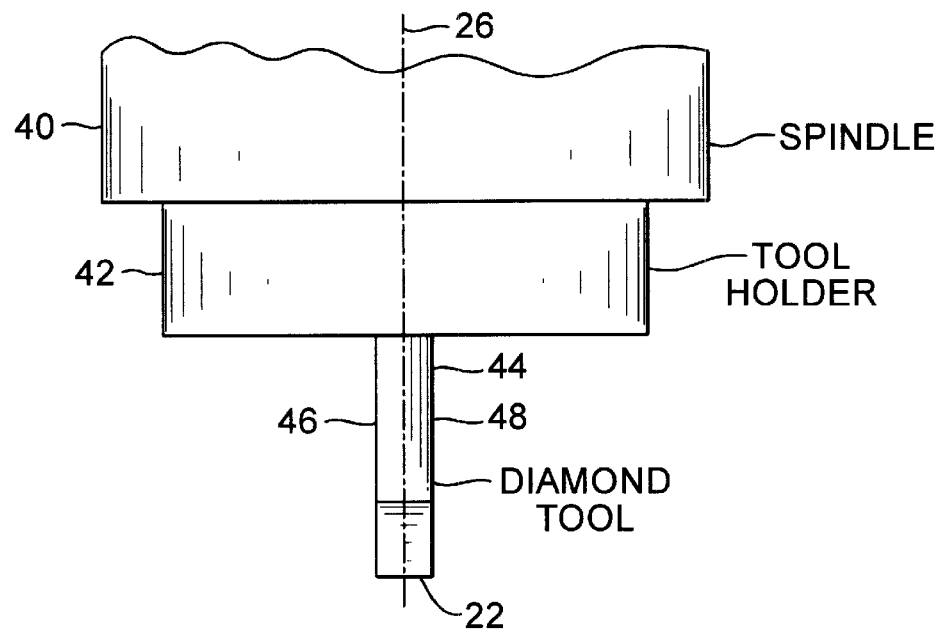

FIGS. 3A, B and C are schematic diagrams illustrating the method and apparatus of the invention;

FIG. 4 illustrates the method when used to make a master having an anamorphic and particularly ellipsoidal shape cavity;

FIG. 5 is a schematic diagram illustrating the method when applied to make an anamorphic cavity in a way different from that used in the method as illustrated in FIG. 4; and FIGS. 6 and 7 are respectively front and left side views of a cutting tool assembly which is used in practicing the invention.

Figure 1:
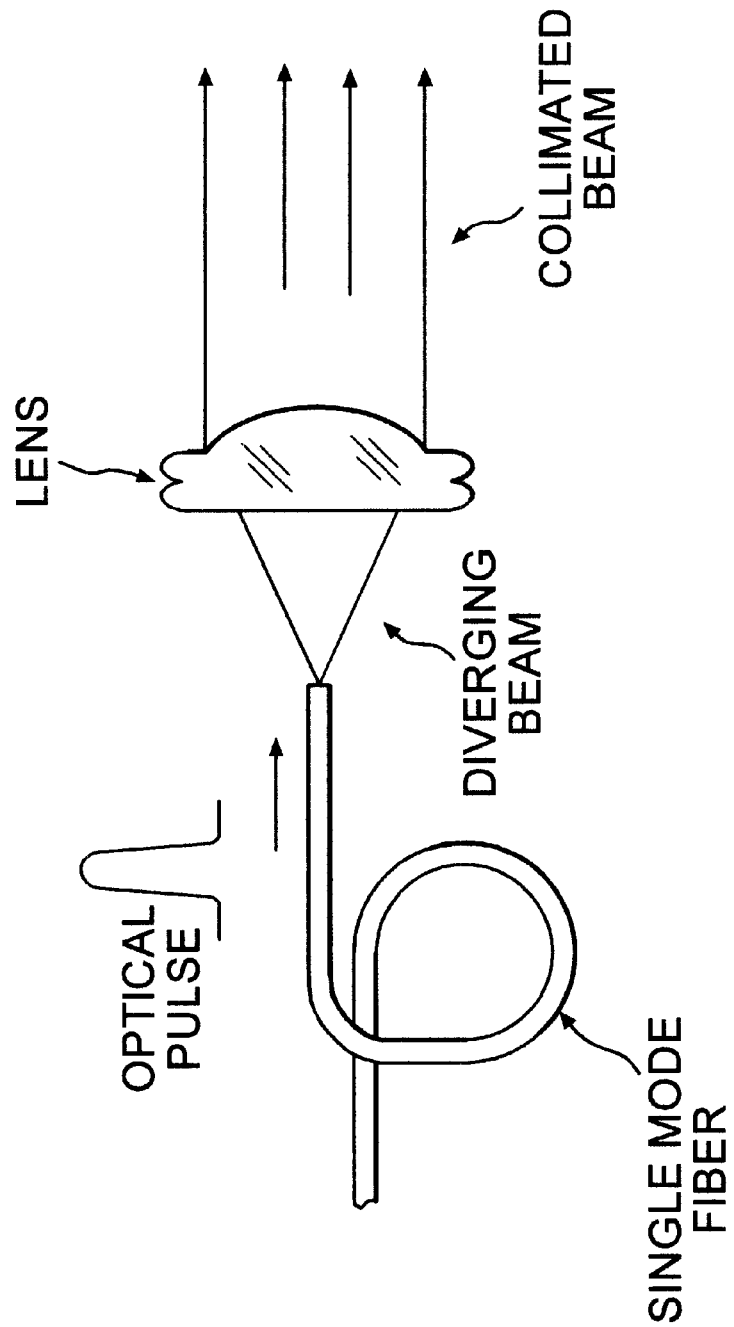
FIG. 1 is a schematic diagram of an optical coupling device in accordance with the prior art.
Figure 2:
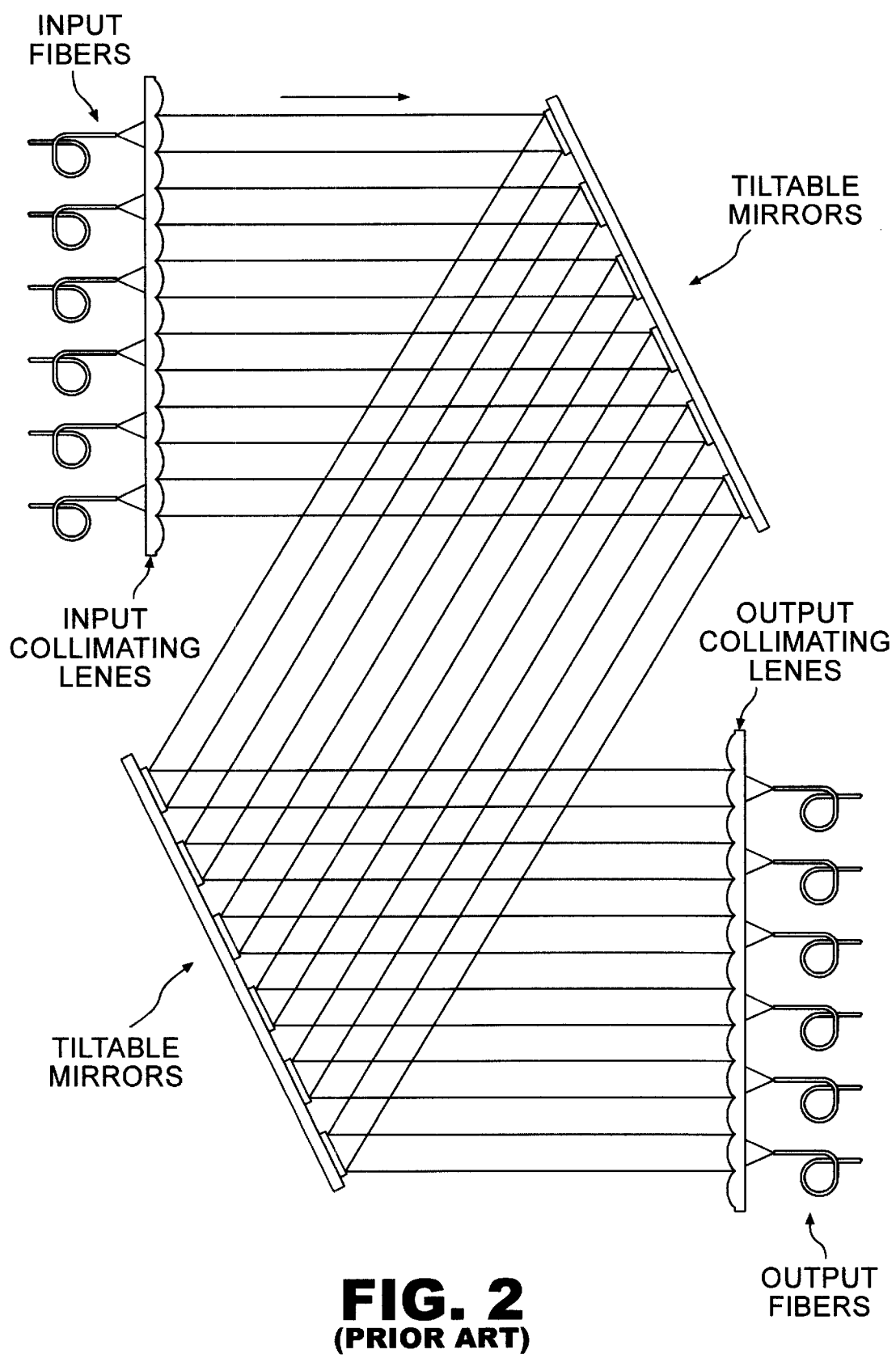
FIG. 2 is a schematic diagram of an optical switch also in accordance with the prior art.

The apparatus and method as shown in FIGS. 3A, B and C is useful in making a mold or master from which a microlens array of positive, spherical lens elements, especially suitable for optical switches such as shown in FIG. 2 may be made.

By way of illustration, and not limitation, the microlens arrays having the following specifications may typically be made utilizing the invention for use in an optical switch:

| Lens array size: | Up to 80 × 80 mm |
| Number of lenses (M × N) | Up to 40 × 40 lenses |
| Radius of curvature range of lenses | 0.2 to 3 mm |

-continued

| Focal length range of lenses | 0.15 to 6 mm |
| Surface irregularity of lenses | <0.5 waves @ 632.8 nm (3σ) |
| Surface roughness of lens (Ra) | <50 Angstroms |
| Range of lens diameters | 0.4 to 1.6 mm |
| Typical lens spacing | 0.5–3 mm |
| Pointing error of lenses | <100 micro-Radians |
| Positional accuracy | +/−1 micron c-c (center to center) spacing |

By way of further illustration, the microlens arrays have the following specifications may typically be made utilizing the invention in other applications, such as lighting, and liquid crystal display coupling:

| Lens array size: | Up to 250 × 400 mm |
| Number of lenses (M × N) | Up to 250,000 lenses |
| Radius of curvature range of lenses | 0.05 to 10 mm |
| Focal length range of lenses | 0.1 to 20 mm |
| Surface irregularity of lenses | <0.25 waves @ 632.8 nm (3σ) |
| Surface roughness of lens (Ra) | <20 Angstroms |
| Range of lens diameters | 0.1 to 10 mm |
| Typical lens spacing | >0.2 mm |
| Pointing error of lenses | <40 micro-Radians |
| Positional accuracy | +/−1 micron c-c (center to center) spacing |

As shown in FIGS. 3A, B, and C, a single point diamond form tool 20 has a generally cylindrical cutting surface 22 with a radius 23 measured from the center 24 on the axis of rotation 26 of the tool 20. The shape of the cutting surface corresponds to the profile curvature of the lenses of the arrays which are to be manufactured. The mold or tool used for the replication of the array is initially a substrate 28 of hard machinable material such as nickel, hard copper or machinable plastic (for example polycarbonate). This substrate is mounted on a translating table such as the X/Y table of a milling machine used for precision manufacture. Such machines may also provide a support for the form tool and mount the spindle of the tool by means of which the tool 20 is rotated. Such precision milling machines and platforms are available from the Moore Tool Company of Keene, N.H., USA.

The axis of the tool in FIGS. 3A, B and C is coincident with the spindle axis. This axis is inclined with respect to the surface 30 of the substrate at an angle which is related to the depth to be machined, when the tool is reciprocated with respect to the substrate in a direction indicated in the drawing as the direction of plunge, i.e., along a line perpendicular from the center 24 to the surface 30.

Figure 3B:
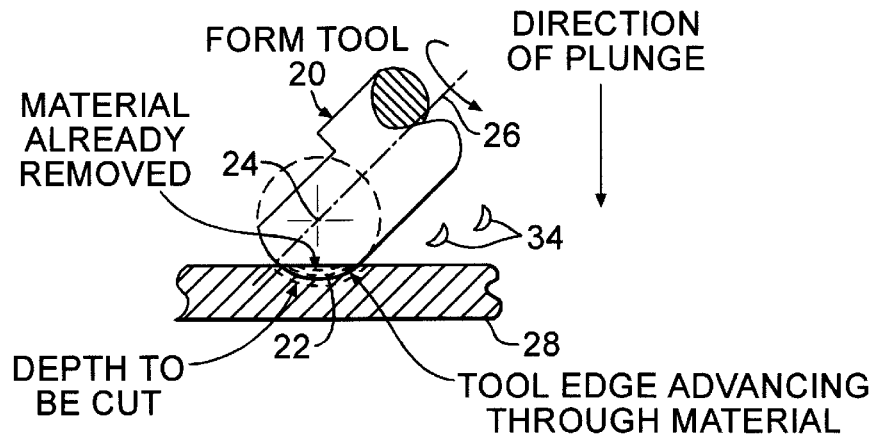

The tool has a zero velocity of rotation where the axis 26 intersects the cutting surface 22. This point of zero velocity is indicated at 32. It will be noted that 32 is maintained away from the surface 30 even when the tool is fully plunged its maximum displacement into the substrate 28. This assures that divots are not cut, but rather a continuous swarf is cut as the tool is brought into and out of cutting engagement with the substrate 28. This swarf is indicated at 34 in FIG. 3B. FIG. 3A shows the apparatus during set up and prior to reciprocation of the tool 20. FIG. 3B shows the tool advancing through the material of the substrate to the depth of the cavity to be cut for this depth is determined by the smooth cutting surface and the radius of this surface to the center 24.

Figure 3C:
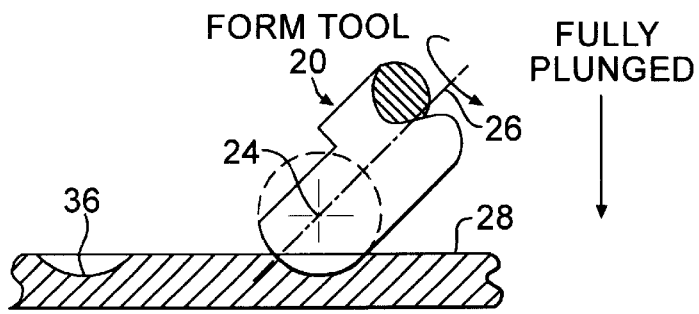

FIG. 3C illustrates the cavity 36 which has been formed and the movement of the substrate to a second position. At this position the tool 20 is fully plunged in the process of cutting a second cavity which will define another microlens of the microlens array to be replicated.

FIGS. 6 and 7 illustrate the spindle 40 in which a tool holder 42, integral with a diamond cutting or form tool 44 having the circular (in cross-section) cutting surface 22. The tool 40 is a tooth of diamond having sides 46 and 48 which define the edges of the cutting surface 22. This surface is generally cylindrical although it may be spherical.

FIG. 4 illustrates how the invention is used to obtain cavities and of course corresponding lenses and other optical devices of anamorphic shape. An elliptical cavity 48 shown in FIG. 4 is made by translating the substrate 28 in the X direction during reciprocation of the tool 28 to cut the cavity. A cylindrical cavity may be made by holding the tool fully plunged and translating the substrate 28 in the Y direction.

Alternatively, as shown in FIG. 5, an anamorphic shape may be obtained by off setting the axis 26 of the tool 20 from the spindle or rotational axis. In either case as shown in FIG. 4 or 5, the relative velocity of movement (translation in case of the substrate 28) and reciprocation (in the case of the tool 20) may be varied in a related or synchronized manner thereby changing the anamorphic surface of the cavity from a continuous surface of rotation to a toric surface.

In all cases as shown in FIGS. 3A–C, 4 and 5 the tool 20 is reciprocated or plunged along a line from the center 24 which is perpendicular to the surface 30 of the substrate 20.

In replicating the devices such as microlens arrays using the mold made from the substrate as a master the following replication method is presently preferred in order to make positive lenses for applications such as in the optical switch shown in FIG. 2. An ultraviolet light curable, low shrink polymer is applied to the surface 28 of the master. This surface may be coated with a release material if desired. Then a transparent substrate is lowered on to the liquid polymer. The polymer is compressed to a prescribed base layer thickness. Then the polymer is cured using ultraviolet light. This turns the liquid polymer into solid material integral with the base layer. The master is separated from the replicated microlens array and may be used to replicate another array. Release material, on the mold surface, may be used.

Other replication methods such as embossing or stamping may be carried out with the master. In such case it may be desirable to coat the master with a hard material for facilitating embossing or stamping, especially when the master is made of plastic material.

From the foregoing description it will be apparent that improved methods and apparatus for fabrication of optical devices and particularly microlens arrays have been described. Variations and modifications in the herein described methods and apparatus will undoubtedly become apparent to those skilled in this technology. Accordingly the foregoing description should be taken as illustrative and in the limiting sense.

What is claimed is:

1. In a method for making a mold with which optical devices may be replicated, said method comprising the steps of:
   orienting a tool along an axis inclined to a mold surface of said mold, said tool having a tip surface which corresponds in shape to the shape of an optical surface which said optical devices present;
   rotating said tool on said axis;
   bringing said tool and said mold surface into cutting engagement to form a cavity having said shape in said mold surface; and
   limiting the relative motion of said tool and said mold surface into cutting engagement such that the portion of the tip surface on the axis does not participate in the cutting of said cavity.

2. The method according to claim 1 wherein said tip is in the form of a tooth having sides intersected at the ends thereof by said tip surface to form cutting edges of said tip surface.

3. The method according to claim 1 wherein said tip is operative to produce swarf from said mold surface to provide said cavity.

4. The method according to claim 1 wherein said optical device is a lens and said shape includes a segment of a circle having a radius from a center on said axis.

5. The method according to claim 5 wherein said step of bringing said tool and said mold surface into engagement includes movement along a line between said center and said mold surface.

6. The method according to claim 5 wherein said line is perpendicular to said mold surface.

7. In a method for making a mold with which optical devices may be replicated, said method comprising the steps of:
   orienting a tool along an axis of inclination inclined to a mold surface of said mold;
   rotating said tool on an axis of rotation;
   bringing said tool and said mold surface into cutting engagement to form a cavity in said mold surface; and
   limiting the relative motion of said tool and said surface into cutting engagement such that the portion of the tip survace on the axis does not participate in the cutting of said cavity.

8. The invention according to claim 7 wherein said axis of inclination and said axis of rotation of said tool are offset such that said cavity has a surface defining an anamorphic profile.

9. The method according to claim 1 wherein said devices are lenses and said tip surface corresponds to a cylinder or sphere having a radius with the center of said radius being on said axis.

10. The method according of claim 1 further comprising the step of translating said mold while moving said tool and said mold surface into and out of cutting engagement thereby providing said cavity with a shape which is generally oblong.

11. The method according to claim 10 wherein a portion of said tip surface corresponds to a segment of a circle having a center on said axis and said engagement is effected by movement of said tip along a line from said center perpendicular to said mold surface, and varying the relationship between the rate of said translating of said mold surface and the rate of said movement of said tip, said cavity thereby having an anamorphic profile.

12. The method according to claim 11 wherein said profile is ellipsoidal.

13. The method according to claim 1 further comprising the steps of moving said mold surface and said tool laterally with respect to each other to successive positions on said mold surface, and repeating said movement into and out of cutting engagement at each of said positions to provide an array of cavities on said mold surface.

14. The method according to claim 13 wherein said tip surface is defined by the end of a radius having its center on said axis of inclination, and said movements are along a line from said center perpendicular to said mold surface, thereby providing a mold with which an array of lenses may be fabricated.

15. The method according to claim 14 wherein said lenses are less than 2 mm in diameter and said array is a microlens array.

16. The method according to claim 14 wherein said lenses are in a range of 0.1 mm to 10 mm in diameter and said array is a microlens array.

17. A method of fabrication of optical devices which comprises the steps of making a mold from which such devices can be fabricated by machining one or more cavities into a substrate from a surface of said substrate using a tool having a cutting surface at a tip thereof which tool is rotatable in a spindle about an axis, tilting said tool so that said axis is inclined to said substrate surface, rotating said tool about said axis, and moving said tool with respect to said substrate to bring said cutting surface into and out of cutting engagement with said substrate, thereby forming one or more cavities in said substrate surface, wherein said cutting surface when rotated about said axis has a point on said axis of substantially zero rotational velocity, and said inclination being sufficient to maintain said point on said axis away from said substrate surface when said cutting surface and said substrate surface are in cutting engagement.

18. The method according to claim 17 wherein said cutting surface is defined by the end of a raduis having the center therof on said axis, and said cutting engagement is effected by movement along a line from said center perpendicular to said substrate surface.

19. The method according to claim 17 wherein said cutting surface defines a segment of a sphere or cylinder and said devices are lenses.

20. The method according to claim 19 wherein said substrate is material selected from machinable metal and plastic and said lenses are positive lenses replicated with said mold by molding processes selected from the group consisting of stamping, embossing and casting using said substrate into said one or more cavities.

21. The method according to claim 19 further comprising the step of replicating negative or concave surface lenses with said mold by fabricating an intermediate mold having convex protuberances corresponding to said one or more cavities, and using said intermediate mold to form lenses having said concave surfaces in another substrate.

22. Apparatus for making one or more optical devices which comprises a substrate of machinable material having a substrate surface, a form tool having a tip providing a cutting surface shape corresponding with a surface shape of said one or more optical devices, means enabling rotation of said tool about an axis inclined, to said substrate surface, at an angle related to the height of the surface of said one or more optical devices to be made using said apparatus, and means enabling reciprocation of said tool to bring said cutting surface into cutting engagement with said substrate such that one or more cavities is formed therein the surfaces of which cavities have a profile corresponding to the profile of said one or more optical devices, wherein said angle of inclination of said axis is sufficient such that an portion of the tip surface on the axis remains external to a given cavity during formation of said given cavity.

23. The apparatus according to claim 22 wherein said substrate is moveable in transverse directions to locate said cavities at a plurality of different positions.

24. The apparatus according to claim 22 wherein said cutting surface is a segment of a cylinder of sphere having a radius with its center on said axis such that the devices are lenses.

25. The apparatus according to claim 24 wherein said forming tool is reciprocated along a line of said center to said surface.

26. The apparatus according to claim 22 wherein said substrate is a tool for replication of said devices which are individually shaped by different ones of said cavities.

27. The apparatus according to claim 22 wherein said tip cutting surface is of material.

* * * * *